(12) United States Patent
Clark et al.

(10) Patent No.: US 7,646,837 B2
(45) Date of Patent: Jan. 12, 2010

(54) IMPLEMENTING BANDWIDTH CONTROL IN A COMMUNICATIONS LINK

(75) Inventors: Scott Douglas Clark, Rochester, MN (US); Dorothy Marie Thelen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 608 days.

(21) Appl. No.: 11/380,727

(22) Filed: Apr. 28, 2006

(65) Prior Publication Data

US 2007/0253448 A1    Nov. 1, 2007

(51) Int. Cl.
*H04L 7/00* (2006.01)

(52) U.S. Cl. ...................................... 375/354; 375/373

(58) Field of Classification Search ............... 375/354, 375/369, 373
See application file for complete search history.

(56) References Cited

U.S. PATENT DOCUMENTS

2002/0023191 A1\*    2/2002    Fudeyasu .................. 711/104

\* cited by examiner

*Primary Examiner*—Kevin Y Kim
(74) *Attorney, Agent, or Firm*—Joan Pennington

(57) ABSTRACT

A method and apparatus are provided for implementing bandwidth control in a communication link. A set link configuration for the communications link establishes a number of clock cycles required to transmit a data envelope. A control function aligns a start of a data packet on a fixed cycle boundary for data envelope transmissions. The control function aligns the start of a data packet in the same byte of the 16 byte field. The control function is implemented with a memory management input/output (MMIO) register and a counter, and allows a transmitting side of the communications link to control the pacing of data packet transmission or bandwidth by aligning all data packets on fixed-cycle boundaries.

14 Claims, 4 Drawing Sheets

IMPLEMENTING BANDWIDTH CONTROL IN A COMMUNICATIONS LINK

FIELD OF THE INVENTION

The present invention relates generally to the data processing field, and more particularly, relates to a method and apparatus for implementing bandwidth control in a communication link, such as a processor input/output (I/O) interface or other interface.

DESCRIPTION OF THE RELATED ART

Bandwidth continues to increase on communication links requiring wider dataflows. As a result the receiving logic continues to become more complex and more susceptible to design problems.

For example, a conventional communication link design receiving 16 bytes of data every clock cycle can have the start of a data packet aligned in any of the 16 bytes. Also the 16 bytes of data can contain both the end of one data packet and the start of another data packet. This results in the necessity for complex receive logic and increased likelihood of design problems.

A need exists for an effective mechanism for providing the capability to significantly simplify required receiving logic for the communication link.

SUMMARY OF THE INVENTION

A principal aspect of the present invention is to provide a method and apparatus for implementing envelope alignment and pacing for bandwidth control in a communication link, such as a processor input/output (I/O) interface. Other important aspects of the present invention are to provide such method and apparatus for implementing bandwidth control substantially without negative effect and that overcome many of the disadvantages of prior art arrangements.

In brief, a method and apparatus are provided for implementing bandwidth control in a communication link. A set link configuration for the communications link establishes a number of clock cycles required to transmit a data envelope. A control function aligns a start of a data packet on a fixed cycle boundary for data envelope transmissions.

In accordance with features of the invention, a link configuration pacing logic uses the set link configuration to pace the transmission of the data envelope by establishing the number of clock cycles required to transmit a data envelope. The control function aligns the start of a data packet in the same byte of the 16 byte field. The control function is implemented with a memory management input/output (MMIO) register and a counter, and allows a transmitting side of the communications link to control the pacing of data packet transmission or bandwidth by aligning all data packets on fixed-cycle boundaries.

In accordance with features of the invention, the counter increments with each clock cycle until a threshold value set in the MMIO register is reached. When this threshold is reached, a pulse is generated to signal that a data transmission can be started and the data transmission only starts on the clock cycle where the pulse is received.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In accordance with features of the invention, a method and apparatus are provided that allows the transmitting side of a communications link to control or throttle bandwidth by aligning all data packets on fixed-cycle boundaries. The control function advantageously is used to force consistent alignments of data packets, or to control the pacing of data packet transmission. The ability to control the bandwidth has important advantages. It allows the receive logic to be simplified and also allows the ability to adjust for problems in the receive logic.

Figure 1:
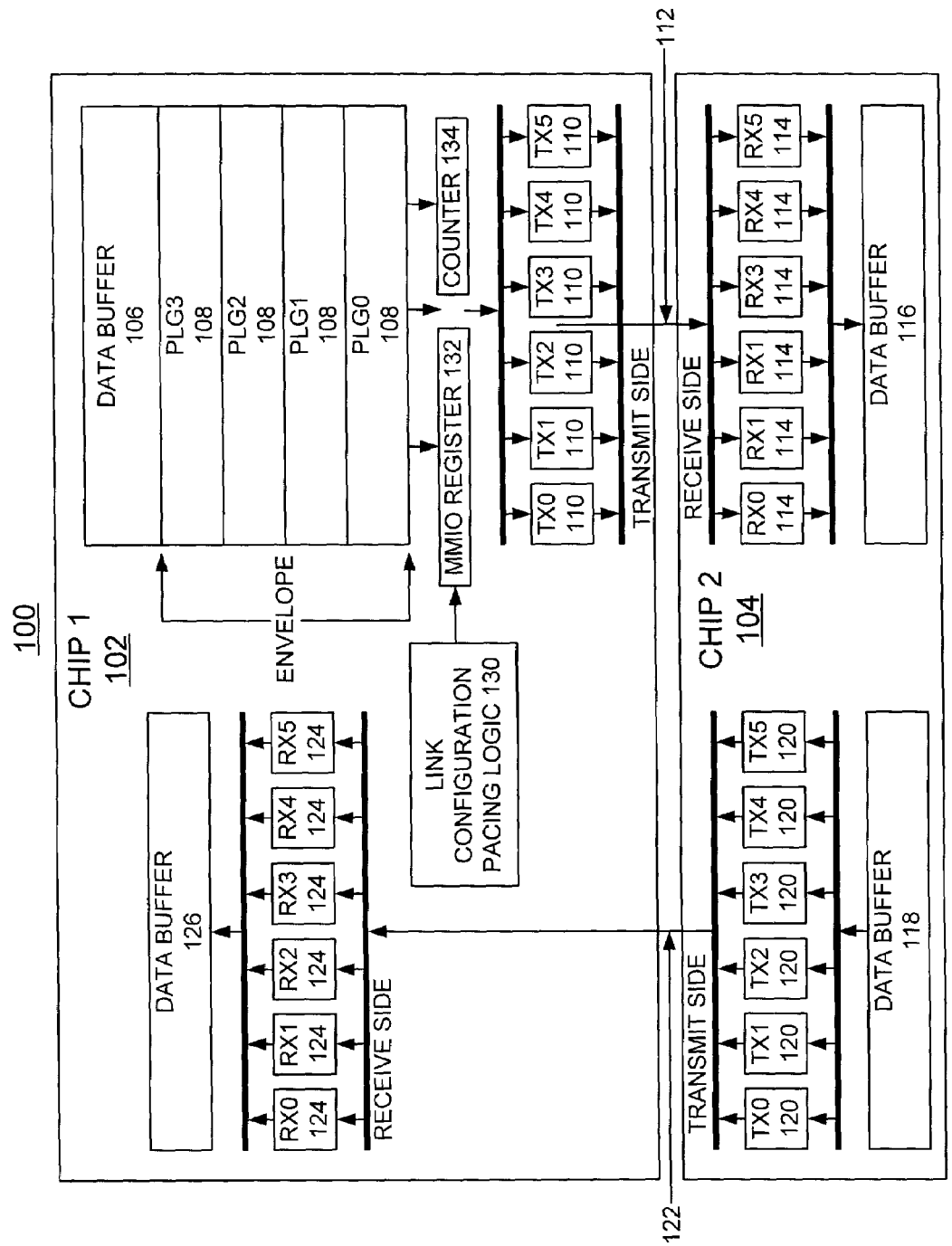
FIG. 1 is a high-level system diagram illustrating an exemplary system for implementing envelope alignment and pacing for bandwidth control and debug in communications link, such as, a processor input/output (I/O) interface in accordance with the preferred embodiment.

Having reference now to the drawings, in FIG. 1, there is shown an exemplary system generally designated by the reference character 100 in accordance with the preferred embodiment. System 100 includes a first chip 1, 102 and a second chip 2, 104.

First chip 1, 102 includes a data buffer 106 including a plurality of physical layer groups (PLGs) PLG0, PLG1, PLG2, PLG3, 108 defining an envelope. In the system 100, a data packet consists of an envelope, for example, containing four 144-bit PLGs. First chip 1, 102 includes a transmit side including a plurality of transmitters TX0-TX5, 110 coupled to the data buffer 106 for sending data packets or envelopes via a communications link 112 to the second chip 2, 104.

Second chip 2, 104 includes a receive side including a plurality of receivers RX0-RX5, 114 coupled to the communications link 112 and coupled to a data buffer 116.

As shown in FIG. 1, second chip 2, 104 also includes a transmit side including a data buffer 118 and a plurality of transmitters TX0-TX5, 120 coupled to a communications link 122 for transmitting data to the first chip 1, 102. First chip 1, 102 includes a receive side including a plurality of receivers RX0-RX5, 124 coupled to the communications link 122 and coupled to a data buffer 126.

In accordance with features of the invention, a link configuration pacing logic 130 uses a link configuration for communications link 112 to establish the number of BClk cycles required to transmit an envelope via communications link 112 to the second chip 2, 104. A particular link configuration is provided based upon a particular arrangement of chips 102, 104 or a particular application of system 100.

Figure 3A:
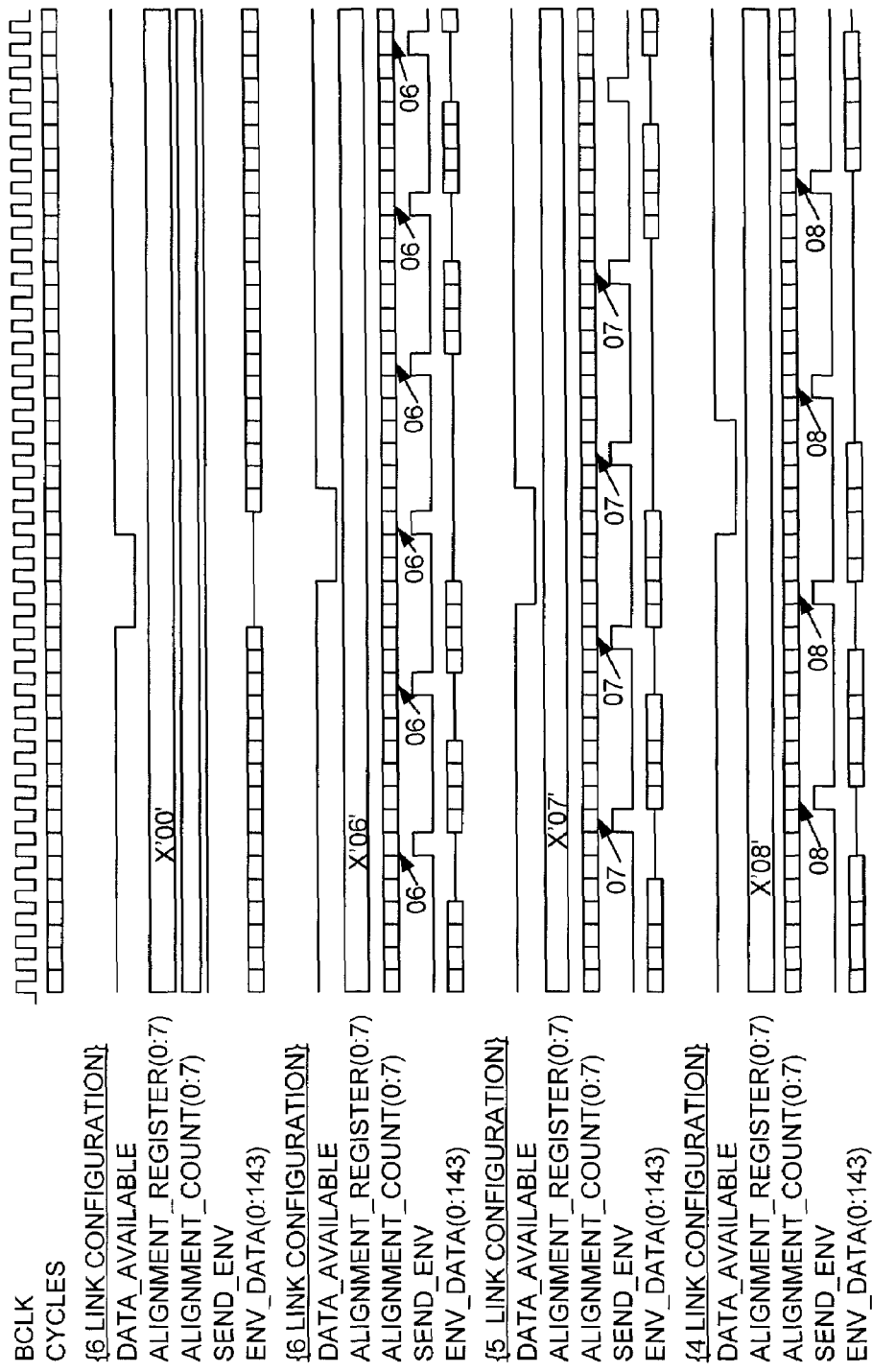
FIGS. 3A and 3B are timing diagrams illustrating exemplary operations for multiple exemplary link configurations of the communication link system of FIG. 1 for implementing envelope alignment and pacing for bandwidth control and debug in accordance with the preferred embodiment.
Figure 3B:
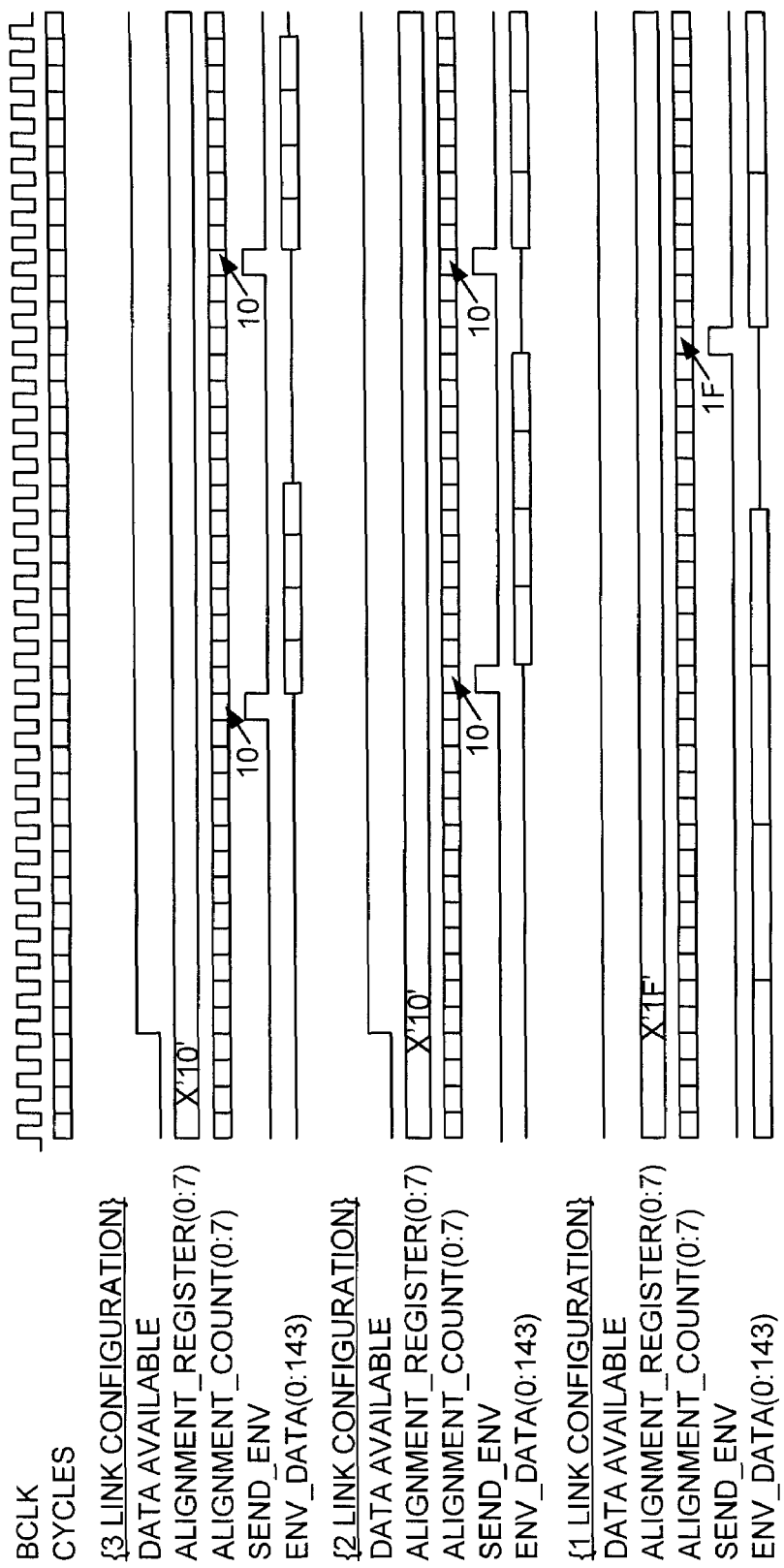

Referring also to FIGS. 3A and 3B, for example with an envelope including four 144-bit PLGs, a 6-byte link configuration for communications link 112 requires four BClk cycles to transmit an envelope, a 5-byte link requires five BClk cycles, a 4-byte link requires six BClk cycles, a 3-byte link requires eight BClk cycles, a 2-byte link requires twelve BClk cycles and a 1-byte link requires twenty-four BClk cycles.

In accordance with features of the invention, link configuration pacing logic 130 is coupled to a memory management input/output (MMIO) register 132 and a counter 134 of the preferred embodiment. MMIO register 132 and counter 134 together implements a control function allowing the transmitting side of the communications link 112 to control or throttle the bandwidth by aligning all data packets on fixed-cycle boundaries. This control function is used to force consistent alignments of data packets, and to control the pacing of data packet transmission.

In accordance with features of the invention, the counter 134 increments every BClk cycle until a threshold value set in the MMIO register 132 is reached. When this threshold is reached, a pulse is generated to signal the transmission logic that a transmission can be started, as illustrated in FIGS. 3A and 3B at the line labeled SEND_ENV. The transmission can only start on the BClk cycle the pulse is received. The internal counter 134 is reset to zero when the threshold is reached and begins incrementing again on the next BClk cycle.

In accordance with features of the invention, MMIO register 132 stores, for example, an eight-bit MMIO field that controls the BClk cycle granularity on which the envelope transmission starts on communications link 112. Envelope transmission begins only on cycle boundaries that are multiples of the value set in this field plus one, instead of the conventional operation in which transmission begins any time an envelope is pending to be sent.

For example, if the communications link 112 is configured to be a 6-byte link, and the value in this field is set to X'05', a new envelope is only transmitted on cycles n, n+6, n+12, n+18, and the like. Since an envelope requires only four BClk cycles to transmit on a 6-byte link, there is always a minimum of two BClk cycles or six link cycles between envelopes.

Control function implemented MMIO register 132 and counter 134 provides the capability to brick-wall envelopes or to continuously transmit envelopes without any BClk cycles between the envelopes. For example, if the link is configured to be a 4-byte link, and the value of the MMIO field is set to X'05', a new envelope can be transmitted every 6-BClk cycles. Since an envelope requires only six BClk cycles to transmit on a 4-byte link, no BClk cycles occur between envelopes.

Figure 2:
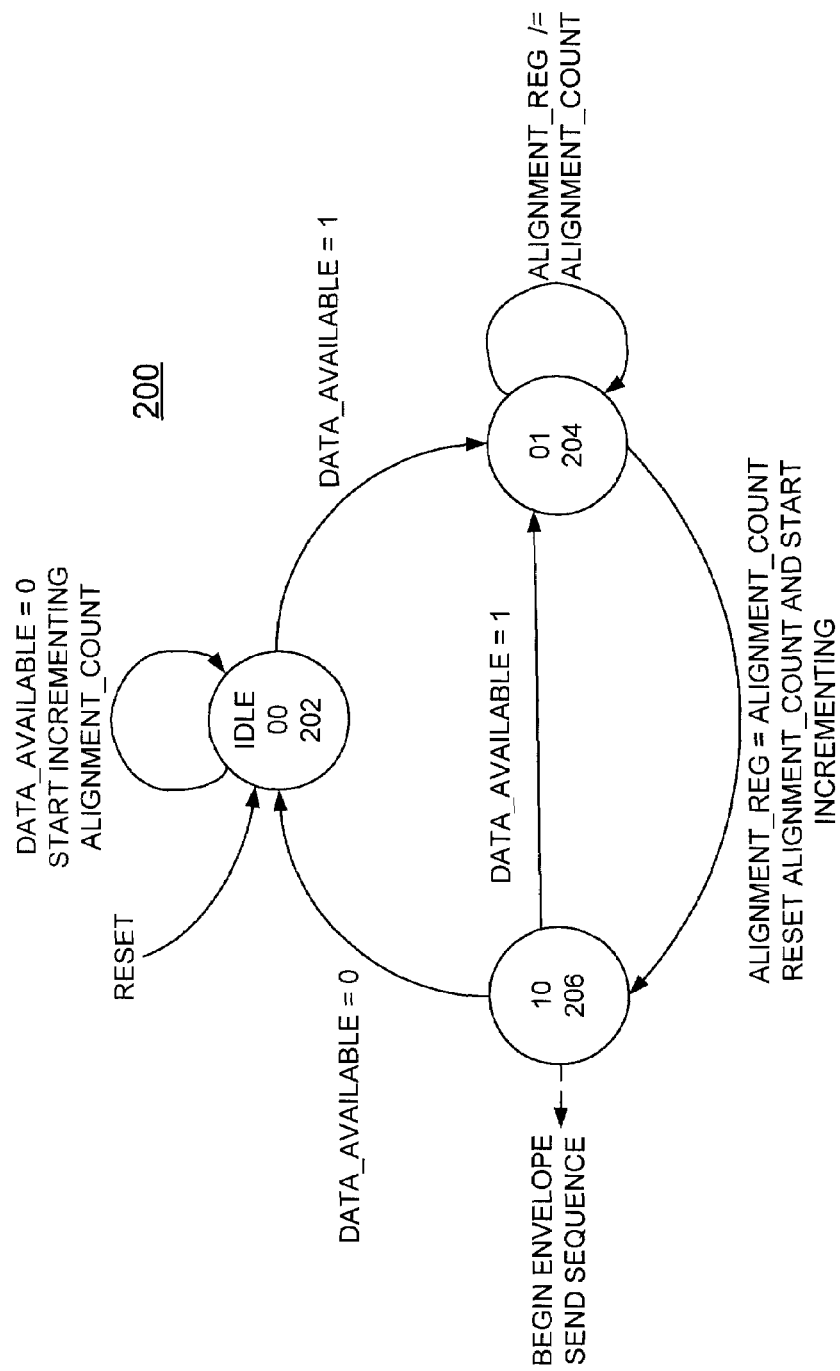
FIG. 2 is an exemplary state diagram illustrating exemplary operations of system of FIG. 1 for implementing envelope alignment and pacing for bandwidth control and debug in accordance with the preferred embodiment.

MMIO register 132 is implemented, for example, using an eight-bit MMIO register and counter 134 is implemented, for example, using an eight-bit internal counter Referring also to FIG. 2, there is shown an exemplary state diagram illustrating exemplary operations of system 100 for implementing envelope alignment and pacing for bandwidth control and debug in accordance with the preferred embodiment.

An idle state 00, 202 is entered responsive to a reset input indicated RESET and a data available input indicated DATA_AVAILABLE=0. At the idle state 00, 202, incrementing counter 134 is performed indicated by START INCREMENTING ALIGNMENT_COUNT.

A control state 01, 204 is entered responsive to a data available input indicated DATA_AVAILABLE=1. At the control state 01, 204 the counter 134 is incremented with each BClk cycle until the threshold value set in the MMIO register 132 is reached indicated by ALIGNMENT_REG/=ALIGNMENT_COUNT.

An envelope transmission state 10, 206 is entered responsive to the counter 134 reaching the threshold value set in the MMIO register 132, indicated by ALIGNMENT_REG=ALIGNMENT_COUNT RESET ALIGNMENT_COUNT AND START INCREMENTING. At the envelope transmission state 10, 206 transmission begins.

FIGS. 3A and 3B are timing diagrams illustrating exemplary operations for multiple exemplary link configurations of the communication link 112 in system 100 for implementing envelope alignment and pacing for bandwidth control and debug in accordance with the preferred embodiment.

In FIGS. 3A and 3B, the BClk and BClk cycles are shown near the top of the diagram. With each illustrated exemplary link configurations of the communication link 112, a data available signal is shown at a line labeled DATA_AVAILABLE. Next the value of MMIO register 132 and counter 134 are illustrated at respective line labeled ALIGNMENT_REGISTER(0:7) and ALIGNMENT_COUNT(0:7). When the values of MMIO register 132 and counter 134 match, a pulse is generated signaling that transmission can be started, as illustrated at the line labeled SEND_ENV. Next envelope transmission is illustrated at a line labeled ENV_DATA(0:143).

In FIG. 3A, next a 6 link configuration is shown with an alignment function disabled with the MMIO register value is set to x'00'.

In FIG. 3A, next a 6 link configuration is shown with the alignment function enabled, and the MMIO register value is set to x'06'. When the ALIGNMENT_COUNT(0:7) equals 06 matching the value set for ALIGNMENT_REGISTER(0:7), then pulse is generated signaling that transmission can be started at line SEND_ENV.

In FIG. 3A, next a 5 link configuration is shown with the alignment function enabled, and the MMIO register value is set to x'07'. When the ALIGNMENT_COUNT(0:7) equals 07 matching the value set for ALIGNMENT_REGISTER(0:7), then pulse is generated signaling that transmission can be started at line SEND_ENV.

In FIG. 3A, next a 4 link configuration is shown with the alignment function enabled, and the MMIO register value is set to x'08'. When the ALIGNMENT_COUNT(0:7) equals 08 matching the value set for ALIGNMENT_REGISTER(0:7), then pulse is generated signaling that transmission can be started at line SEND_ENV.

In FIG. 3B, a 3 link configuration is shown with the alignment function enabled, and the MMIO register value is set to x"10". When the ALIGNMENT_COUNT(0:7) equals 10 matching the value set forALIGNMENT_REGISTER(0:7), then pulse is generated signaling that transmission can be started at line SEND_ENV.

In FIG. 3B, next a 2 link configuration is shown with the alignment function enabled, and the MMIO register value is set to x"10". When the ALIGNMENT_COUNT(0:7) equals 10 matching the value set for ALIGNMENT_REGISTER(0:7), then pulse is generated signaling that transmission can be started at line SEND_ENV.

In FIG. 3B, next a 1 link configuration is shown with the alignment function enabled, and the MMIO register value is set to x"1F". When the ALIGNMENT_COUNT(0:7) equals 1F matching the value set for ALIGNMENT_REGISTER(0:7), then pulse is generated signaling that transmission can be started at line SEND_ENV.

While the present invention has been described with reference to the details of the embodiments of the invention shown in the drawing, these details are not intended to limit the scope of the invention as claimed in the appended claims.

What is claimed is:

1. A method for implementing bandwidth control in a communication link comprising the steps of:
   using a set link configuration for the communications link to establish a number of clock cycles required to transmit a data envelope;
   providing a control function for aligning a start of each data packet on a fixed cycle boundary; and
   implementing said control function with a memory management input/output (MMIO) register and a counter.

2. A method for implementing bandwidth control as recited in claim 1 includes providing a link configuration pacing logic to establish said number of clock cycles required to transmit said data envelope using said set link configuration for the communications link.

3. A method for implementing bandwidth control as recited in claim 1 further includes storing a threshold value in said MMIO register.

4. A method for implementing bandwidth control as recited in claim 3 further includes incrementing said counter with each clock cycle until said threshold value set in the MMIO register is reached.

5. A method for implementing bandwidth control as recited in claim 4 further includes responsive to reaching said threshold value, generating a pulse to signal that a data envelope transmission can be started.

6. A method for implementing bandwidth control as recited in claim 5 further includes starting said data envelope transmission on a next clock cycle when said pulse is received.

7. A method for implementing bandwidth control as recited in claim 5 further includes resetting said counter to zero, and incrementing said counter with each clock cycle until said threshold value set in the MMIO register is reached.

8. A method for implementing bandwidth control as recited in claim 1 wherein said control function aligns said start of said data packet in a defined byte of a multiple byte field.

9. Apparatus for implementing bandwidth control in a communication link comprising:
   a link configuration pacing logic for establishing a number of clock cycles required to transmit a data envelope based upon a set link configuration for the communications link; and
   a control function for aligning a start of each data packet on a fixed cycle boundary; said control function being implemented with a memory management input/output (MMIO) register and a counter.

10. Apparatus for implementing bandwidth control as recited in claim 9 wherein said MMIO register storing a threshold value.

11. Apparatus for implementing bandwidth control as recited in claim 10 wherein said counter is incremented with each clock cycle until said threshold value set in the MMIO register is reached.

12. Apparatus for implementing bandwidth control as recited in claim 11 wherein said control function generates a pulse to signal that a data envelope transmission can be started responsive to a counter value matching said threshold value.

13. Apparatus for implementing bandwidth control as recited in claim 11 wherein said counter is reset to zero responsive to said counter value matching said threshold value, and said counter is incremented with each clock cycle until said threshold value set in the MMIO register is reached.

14. Apparatus for implementing bandwidth control as recited in claim 12 wherein said control function starts a data envelope transmission on a next clock cycle when said pulse is received.

* * * * *